United States Patent
Al-Mutairi et al.

(10) Patent No.: US 8,980,801 B2
(45) Date of Patent: Mar. 17, 2015

(54) ZERO-LEAKOFF GEL

(71) Applicant: Saudi Arabian Oil Company, Dhahran (SA)

(72) Inventors: Saleh Haif Al-Mutairi, Dhahran (SA); Ali Dahmal Al-Aamri, Dhahran (SA); Khalid A. Al-Dossary, Dhahran (SA); Mubarak Auodah Al-Dhufairi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 14/175,205

(22) Filed: Feb. 7, 2014

(65) Prior Publication Data

US 2014/0155303 A1 Jun. 5, 2014

Related U.S. Application Data

(62) Division of application No. 13/934,861, filed on Jul. 3, 2013, now Pat. No. 8,684,081, which is a division of application No. 12/861,570, filed on Aug. 23, 2010, now Pat. No. 8,499,833.

(51) Int. Cl.
| | |
|---|---|
| *C09K 8/74* | (2006.01) |
| *C09K 8/68* | (2006.01) |
| *C09K 8/92* | (2006.01) |
| *C09K 8/78* | (2006.01) |
| *C09K 8/50* | (2006.01) |
| *E21B 43/26* | (2006.01) |

(52) U.S. Cl.
CPC ... *C09K 8/92* (2013.01); *C09K 8/78* (2013.01); *C09K 8/50* (2013.01); *E21B 43/26* (2013.01); *C09K 2208/14* (2013.01)

USPC ........................................... 507/269; 507/203

(58) Field of Classification Search
USPC .................................................. 507/269, 203
See application file for complete search history.

(56) References Cited

U.S. PATENT DOCUMENTS

| | | | |
|---|---|---|---|
| 1,922,154 | A | 8/1933 | De Groote |
| 2,236,147 | A | 3/1941 | Lerch et al. |
| 2,330,145 | A | 9/1943 | Reimers |
| 2,597,871 | A | 5/1952 | Iler |
| 2,706,688 | A | 4/1955 | Sommer et al. |
| 3,375,872 | A | 4/1968 | McLaughlin et al. |
| 3,377,293 | A | 4/1968 | Shepherd |

(Continued)

FOREIGN PATENT DOCUMENTS

| | | |
|---|---|---|
| EP | 0305611 A1 | 3/1989 |
| WO | 2009038874 A1 | 3/2009 |
| WO | 2010015879 A2 | 2/2010 |

OTHER PUBLICATIONS

Economides et al., "Performance of Fracturing Materials", Reservoir Stimulation Third Edition, 2000, pp. 8-23-8-24, John Wiley & Sons Ltd, England.

(Continued)

*Primary Examiner* — Susannah Chung
*Assistant Examiner* — Atnaf Admasu
(74) *Attorney, Agent, or Firm* — Bracewell & Giuliani LLP; Constance Gall Rhebergen

(57) ABSTRACT

A silicate gel composition that is useful for sealing the face of a fracture of a formation. A method of sealing a face of a fracture of a formation with the silicate gel composition and diverting an acid treatment fluid.

6 Claims, 1 Drawing Sheet

(56) References Cited

U.S. PATENT DOCUMENTS

| | | |
|---|---|---|
| 3,378,074 A | 4/1968 | Kiel |
| 3,390,723 A | 7/1968 | Hower et al. |
| 3,435,899 A | 4/1969 | McLaughlin et al. |
| 3,464,494 A | 9/1969 | McLaughlin |
| 3,865,190 A | 2/1975 | Christopher et al. |
| 3,977,472 A | 8/1976 | Graham et al. |
| 4,031,958 A * | 6/1977 | Sandiford et al. ............ 166/270 |
| 4,042,031 A | 8/1977 | Knapp |
| 4,090,887 A | 5/1978 | Marquisee et al. |
| 4,215,001 A | 7/1980 | Elphingstone et al. |
| 4,233,165 A | 11/1980 | Salathiel et al. |
| 4,428,424 A | 1/1984 | Lacy et al. |
| 4,509,598 A | 4/1985 | Earl et al. |
| 4,973,410 A | 11/1990 | Pinschmidt, Jr. et al. |
| 6,069,118 A | 5/2000 | Hinkel et al. |
| 6,207,620 B1 | 3/2001 | Gonzalez et al. |
| 6,284,714 B1 | 9/2001 | Bland et al. |
| 7,237,609 B2 | 7/2007 | Nguyen |
| 7,823,642 B2 | 11/2010 | Gadiyar et al. |
| 8,499,833 B2 | 8/2013 | Al-Mutairi et al. |
| 2003/0141064 A1 | 7/2003 | Roberson, Jr. |
| 2005/0107263 A1 | 5/2005 | Bland et al. |
| 2008/0064612 A1 | 3/2008 | Xiang |
| 2009/0111718 A1 | 4/2009 | Gadiyar et al. |

OTHER PUBLICATIONS

International Preliminary Report on Patentability, PCT/US2011/046591, dated Nov. 22, 2012.

International Search Report, PCT/US2011/046591, dated Sep. 29, 2011.

* cited by examiner

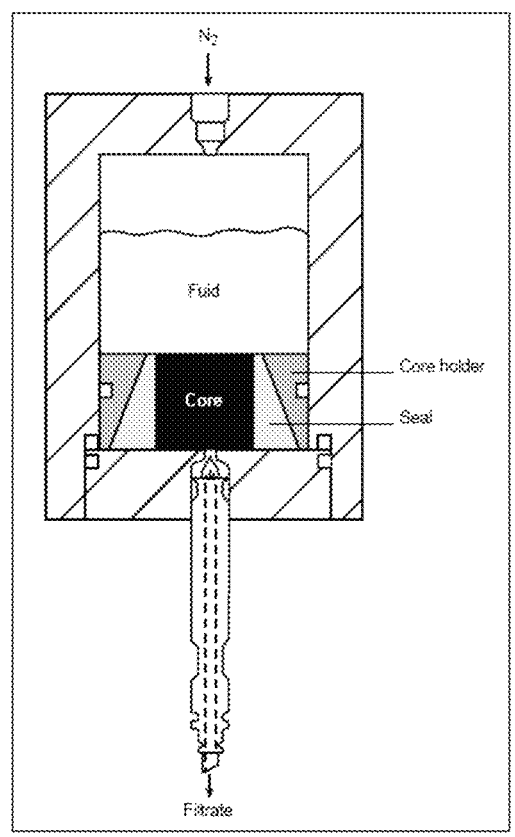

ZERO-LEAKOFF GEL

RELATED APPLICATIONS

This patent application is a divisional application of U.S. patent application Ser. No. 13/934,861 (filed Jul. 3, 2013), now U.S. Pat. No. 8,684,081 (issued Apr. 1, 2014), titled "Zero-Leakoff Gel", which is a divisional application of U.S. patent application Ser. No. 12/861,570 (filed Aug. 23, 2010), now U.S. Pat. No. 8,499,833 (issued Aug. 6, 2013), titled "Zero-Leakoff Emulsified Acid". For purposes of United States patent practice, this application incorporates the contents of the prior applications and patents by reference in their entirety.

BACKGROUND OF THE INVENTION

1. Field of the Invention

The field of invention relates to a silicate gel composition formed in-situ and its method of use. More specifically, the field relates to a silicate gel composition that forms in a well bore and a method of diverting a treatment fluid in a well bore.

2. Description of the Related Art

Stimulation treatment of wells is a common practice to enhance the production from oil and gas producing wells or the injectivity of water injection wells. Several ways exist to execute these stimulation treatments and their definition depends on the way the treatments are executed or the fluid used therein. When relatively small volumes of acids are used to remove the damage surrounding the wellbore, the treatment is referred to as matrix stimulation treatment. Matrix stimulation treatment generally involves pumping fluids, usually acids with other additives, to the wellbore and squeezing the fluids inside the formation to a shallow penetration depth. Normally, these fluids are pumped at pressures below the parting pressure of formation rock called "reservoir fracture pressure". These matrix stimulation treatment fluids may contain acid only in their simplest form, but normally are mixtures of sophisticated formulations of various acids and other fluids pumped at different stages composing often a preflush, main fluid and postflush, depending on the geometry of the well, the history of its operations with corresponding damage cause and the lithology of its rock.

In carbonaceous formations, the positional change in reservoir properties, often called heterogeneity of the rock, plays a significant role in the outcome of the treatment. The heterogeneity is detrimental in a sense that it causes uneven distribution of the fluids to different layers or sections of the well. It is known that the acid will invade the porous and more permeable layers and sections more than invading the less porous and tighter parts. Even more significant, it causes the porous and permeable parts to become more permeable causing more fluids to invade the same section. The efforts paid by experts in the art to cause the acid to divert from its normal direction and go to tighter and less permeable parts of the formation is known as acid diversion in a process known by uniform acid placement.

Typically, heterogeneity effect is often of less severity in the vertical wells because of their relatively smaller penetration through the formation. On the other hand, placement of these fluids in the horizontal well is hard and a challenging task. Several methods are employed to overcome this challenge. The most common method is the employment of the coiled tubing unit to place these fluids across the formation rock. The coiled tubing unit is pulled out from the wellbore while filling the space inside the wellbore with the stimulating fluids. Rental and use of these coiled tubing units are expensive. Pumping the acid from the wellhead, called bullheading, is less expensive and more convenient. However, there is no existing technique that enables pumping these fluids using this method with good diversion of the fluids. Generally when this type of pumping method is utilized, the fluids, especially acid in carbonate wells, tends to get consumed in the heal of the well resulting in that zone receiving the majority of the stimulation fluids and leaving other parts away from the heal without stimulation.

Another method of the stimulation treatment is fracturing. Fracturing utilizes treating pressures above the reservoir fracturing pressure. Fracturing is normally classified into two main types depending on the fluid used during the closure of the fracture. If acid is used during the closure of the fracture, the treatment is referred to as an acid fracturing stimulation treatment. The enhancement of the production after this treatment depends on the etched surface on the walls of the fracture that is leftover after the exposure to the acid. If, on the other hand, sand or proppant are used to leave the fracture open, the treatment will be called proppant fracturing treatment or more often hydraulic fracturing treatment. Other types of fracturing treatments do exist and are generally referred to as frac and pack and water fracs.

Acid fracturing is normally done for carbonaceous rock because only this type of rock can be etched upon exposure to acids. The enhancement in the permeability in the fractured well depends to a large extent on the conductivity of the resulting fracture. Most significantly, it depends on the etching degree of the surface after exposure to the acid. Also, it depends on the acid penetration length. Normally, the acid does not reach the tip of the created fracture because of its high spending on the inlet of the fracture.

The ratio of the acid penetration length to that of the created fracture is called fracturing efficiency. It is known that the spending of the acid in the fracture is controlled by the leakoff of the acid through the walls of the fracture and is affected largely by the retardation ability of the acid.

A need exists for methods and compositions that can be used to divert acid to different sections in horizontal and vertical wells. There is also a need for improved compositions and methods of fracturing a well that provides for zero leakoff, does not penetrate the formation, and only form a sealing layer on the face of the formation.

SUMMARY OF THE INVENTION

A silicate gel composition that is useful for sealing the face of a fracture of a formation is operable to form a sealing layer upon and adhere to the face on the formation. The silicate gel composition is also operable to maintain a maximum differential pressure value of at least about 50 pounds-per-square-inch-differential (psid) across the sealing layer while upon the face of the formation.

A method of sealing a face of a fracture of a formation with a silicate gel composition and diverting an acid treatment fluid includes the step of forming an acid emulsion fluid. The acid emulsion fluid is operable to form the silicate gel composition upon contacting the face of the fracture. The acid emulsion fluid includes an aqueous acid solution, a silicate, and a hydrocarbon-based isolation fluid. The hydrocarbon-based isolation fluid of the emulsion does not permit interaction between the aqueous acid solution and the silicate. The method includes the step of introducing the acid emulsion fluid to the face of the fracture of the formation. The introduction occurs such that the acid emulsion fluid contacts the face of the fracture and breaks the emulsion. The aqueous acid solution and the silicate interact with one another and form the silicate gel composition. The silicate gel composition acts as a sealing layer upon and adheres to the face of the fracture. The silicate gel composition formed is operable to maintain a maximum differential pressure value of at least about 50 pounds-per-square-inch-differential (psid) across the sealing layer while upon the face of the fracture. The method includes the step of introducing an acid treatment fluid into the formation. The acid treatment fluid is introduced such that the acid treatment contacts and reacts with the formation inside the fracture. The silicate gel composition diverts the acid treatment fluid away from contacting and reacting with the face of the fracture of the formation.

The aqueous acid solution, silicate and hydrocarbon-based isolation fluid form an emulsion such that the aqueous acid solution and silicate are substantially delayed from interacting with each other to form a gel until the emulsion is broken. The emulsion is broken by contact with the rock of the hydrocarbon producing formation. The breaking of the emulsion initiates the interaction between the aqueous acid solution and the silicate such that a gel is formed operable to create a generally impermeable layer sealing the face of the formation where the gel contacts the formation. The impermeable layer does not penetrate inside the formation. This allows for control of fluid loss. This impermeable layer can be removed later as described below.

In an embodiment, the acid emulsion fluid contains the aqueous silicate emulsified in a continuous phase of the hydrocarbon-based isolation fluid.

In an aspect, the acid emulsion fluid is emulsified in a water/oil/water double emulsion or in a separate water phases in a continuous oil phase emulsion.

In formations containing carbonate formation rock, the aqueous acid solution can react with the carbonate formation rock causing breaking of the emulsion. This allows interaction between the acid and the silicate and the creation of the generally impermeable layer which is operable to divert acid during matrix acidizing and acid fracturing.

The types of acids that can be used can be varied depending upon the application in which the compositions are being used. For example, the aqueous acid solution is selected from the group consisting of hydrochloric acid, sulfuric acid, phosphoric acid, nitric acid, formic acid, acetic acid, citric acid, lactic acid, all mineral acids, all organic acids, and mixtures thereof. Other suitable types of acid solutions that can be used will be apparent to those of skill in the art.

It is noted that the acid emulsion fluid defines an electrical conductivity. This electrical conductivity can be controlled. When conductivity is positive (i.e., greater than zero), the emulsion is generally "acid external" (W/O/W). Depending on the formation, it can be advantageous in other circumstances to provide proportions that allow the acid emulsion fluid to have a conductivity equal to zero. When conductivity is zero, the emulsion is generally "oil external".

Various types of additives can be used. For example, an emulsifier is used to form the acid emulsion. Corrosion inhibitors and other common acidizing additives can also be advantageously added to the acid emulsion fluid. Other suitable types of acid additives that can be used will be apparent to those of skill in the art.

The hydrocarbon-based isolation fluid can be selected from refined, or treated hydrocarbons but can also be selected from unrefined, whole crude. Diesel used alone or in combination with other hydrocarbon cuts is suitable as part of as the hydrocarbon-based isolation fluid.

In addition to the acid emulsion fluid, a method for using the acid emulsion fluid delivering a sealant for sealing a portion of the face of a hydrocarbon producing formation in a wellbore includes the step of delivering the acid emulsion fluid into the wellbore into contact with the hydrocarbon production formation. As noted previously, the aqueous acid solution, silicate and hydrocarbon-based isolation fluid form the emulsion such that the aqueous acid solution and silicate are substantially delayed from interacting with each other to form the gel until the emulsion is broken. The acid emulsion fluid is contacted with the hydrocarbon producing formation such that the emulsion is broken, the breaking of the emulsion being adapted to initiate interaction between the aqueous acid solution and the silicate such that the gel is formed. The gel acts as the sealant and is operable to create the generally impermeable layer sealing the face of the formation where the gel contacts the formation.

A major benefit of this invention is that formation of the gel is instantaneous once the emulsion is broken. Therefore, the impermeable layer is very thin but strong enough to prevent leakoff.

DETAILED DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

FIG. 1 provides a schematic diagram of the system that was used to test the leakoff compositions made in accordance with embodiments of the present invention.

DETAILED DESCRIPTION OF THE EXEMPLARY EMBODIMENTS

The silicate gel composition and method of use can be used to solve the diversion problem in horizontal or vertical wells by temporarily coating the target zone. The compositions and methods described herein can be used with a coiled tubing unit to place very strong sealant that results in complete diversion of the acid to different sections in the horizontal well.

The silicate gel composition and method of use can also be used in acid fracturing in a sequential order to temporarily seal the walls of the inlet of the fracture and allow subsequent acid formulations to go deeper inside the fracture resulting in higher length of penetration.

As previously described, embodiments of the present invention include acid emulsion fluids and methods related thereto. For example, in one embodiment, the composition system is composed of hydrochloric acid and sodium silicate emulsified in a continuous diesel phase. In another embodiment, the emulsified acid can be a composition made of a sodium silicate emulsified in diesel which is then emulsified in the acid forming a W/O/W double emulsion. Normally, hydrochloric acid reacts with sodium silicate to form a gel. But as an emulsion, the hydrochloric acid and the sodium silicate are isolated or separated from each other by the hydrocarbon phase.

Both the continuous hydrocarbon phase and the W/O/W acid emulsion compositions are stable emulsions. However, the two reacting fluids which are kept separate in the continuous phase and the W/O/W compositions will react with one another when the fluid makes contacts with the formation rock. After making contact with the formation rock, the reacting fluids will contact each other directly and will form a gel that seals the desired location in the formation.

For example, in the other type of the emulsion, the composition can be made of hydrochloric acid and sodium silicate emulsified in a continuous diesel phase. Hydrochloric acid and sodium silicate in various concentrations are emulsified in the diesel. When the composition makes contact with the formation rock, the hydrochloric acid and sodium silicate will contact each other directly and form a gel. This gel will seal the formation on which the composition was administered and the two reacting fluids made to contact one another.

The aqueous acid solution can include a wide variety of possible acids. There are numerous acids readily available in oil field applications and are appropriate for use in the current invention. In general, silicate solutions will start to precipitate as the solution becomes acidic. The pH drives the gelling rather than the specific acid. Therefore, the aqueous acid solution of the instant invention can include any acid capable of remaining in stable emulsion over time. Strong acids are preferred for purposes of reaction speed. Isolation of the aqueous acid in the acid emulsion fluid allows the reaction to take place at the face of the formation, rather than beginning to react at the surface prior to reaching a target zone.

The types of acids that can be used in embodiments of the present invention can be varied depending upon the application in which the compositions are being used. For example, in a preferred embodiment, the aqueous acid solution is selected from the group consisting of hydrochloric acid, sulfuric acid, phosphoric acid, nitric acid, formic acid, acetic acid, citric acid, lactic acid, all mineral acids, all organic acids, and mixtures thereof. Other suitable types of acid solutions that can be used in embodiments of the present invention will be apparent to those of skill in the art and are to be considered within the scope of the present invention.

The amount of acid used can be varied depending upon the applications in which the compositions are being used. In an aspect, the aqueous acid solution has an acid concentration in a range of about 0.5 wt. % to about 28 wt. % HCl; or alternatively, in a range of about 5 wt. % to about 20 wt. % HCl. In one embodiment, the aqueous acid solution is 20 wt. % HCl. This creates a fast reaction time with carbonate formation rock, thereby breaking the emulsion and allowing the acid to react on the face of the rock immediately before invading inside the formation.

The strength of the created impermeable silicate gel is dependent on the composition of the acid emulsion. Some formulations will fail when high differential pressures are applied to pump the acidizing fluids into the formation. Normally, these pressures range from as low as 50 psi in low rate acidizing treatments to 500 psi in massive acid fracturing treatments.

The use of 20 wt. % HCl also creates the generally impermeable geal layer sealing the face of the formation with sufficient strength to withstand high differential pressures. In an aspect, the maximum differential pressure that the compositions described herein can withstand is up to about 700 psi. In certain wells experiencing high differential pressure, this can be advantageous as the impermeable layer can withstand this pressure without failure. For lower differential pressures, the impermeable gel layer does not need to withstand the same amount of stress.

By sealing the face of the fracture, this extends live acid further inside the fracture. This is a placement technique allowing for enhanced acid fracturing to extend the fracture length. The reaction between the aqueous acid solution and silicate occurs at the face of the formation and therefore does not significantly react inside the formation. This creates a single stage treatment to form the generally impermeable layer on the face of the formation.

In another embodiment, the volume fraction of the aqueous sodium silicate phase in the emulsified acid can be from about 0.05 to about 0.60 (about 5 vol. % to about 60 vol. %); or alternatively, from about 0.07 to about 0.56 (about 7 vol. % and about 56 vol. %, respectively). The amount of silicate used, regardless of which silicate, will vary based, among other things, on the reaction desired and the differential pressures to be encountered. The greater the differential pressure, the higher the amount of sodium silicate generally selected. Other suitable amounts of sodium silicate that can be used will be apparent to those of skill in the art.

In another example, the emulsified acid can be a composition made of an aqueous sodium silicate phase emulsified in diesel which is then emulsified in the aqueous acid, such as hydrochloric acid, forming a W/O/W double emulsion. When the composition makes contact with the formation rock, the hydrochloric acid and sodium silicate will contact each other directly and form a gel. This silicate gel will seal the formation on which the composition was administered and the two reacting fluids made to contact one another.

The hydrocarbon-based isolation fluid of the invention includes those hydrocarbons useful to create a stable emulsion and to isolate the components to delay reaction start time. Diesel is relatively available and can be used in the amount necessary to create a stable emulsion. Examples herein describe the use of 30 vol. % diesel in one exemplary acid emulsion fluid. Various crude oils and crude oil fractions, including xylene, are also hydrocarbons useful in the invention. Those with skill in the art will appreciate that a stable emulsion can be created using crude oils and will recognize the criteria for selecting such crude oils. The crude oil in the emulsion acts to carry the silicate to the appropriate location at the face of the formation for reaction. Other suitable types of hydrocarbons that are suitable for forming a stable emulsion will be apparent to those of skill in the art.

Electrical conductivity identifies and differentiates between emulsion types where the external phase is acidic (electrical conductivity is positive) and where the external phase is hydrocarbon when the fluid is non conductive (zero conductivity). This provides identification of the external phase of the emulsion being acidic (aqueous) or oil (hydrocarbon), respectively. One manner of controlling the type of emulsion created from the aqueous acid solution, silicate solution and hydrocarbon-based isolation fluid is to control the volume fraction of the relative components.

Those with skill in the art will recognize that other methods addressing leakoff attempt to modify viscosity to address the problem. Additionally, suspended particulates may be used for diversion in previous methods. While thickening the fluid may result in a reduction of leakoff, the current invention does not depend upon suspended particulates or viscosity to create the impermeable layer or otherwise divert flow but rather the isolation of the reactants until reaching the target zone. Upon reaction, the silicate gel seals the face to stop the leakoff.

In one embodiment, one characteristic of the compositions is that they give zero leakoff. In another embodiment, one characteristic of the compositions is that they do not penetrate to the formation. In another embodiment, one characteristic of the compositions is that they only form a sealing layer on the face of the rock. In another embodiment, one characteristic of the compositions is that they form thin, strong, instantaneous and removable layer on the face of the rock.

In one embodiment, the compositions are used to reduce or prevent leakoffs. Examples where the compositions can be used include acid fracturing and horizontal well acidizing. In another embodiment, the composition can be used for diverting fluid in horizontal carbonate wells. When the composition makes contact with the carbonate rock, the two reacting fluids will break and form a gel on the face of the formation. This will result in the diversion of the acidizing fluids to another desired location in the well.

In one embodiment, the compositions are used as an acid fracturing fluid. The composition can be used to eliminate the leakoff during acid fracturing and allow the acid to penetrate deeper inside the fracture. The silicate gel seals the formation temporarily during acidizing for diversion. A thin generally impermeable layer is formed on the crest of the wellbore, as opposed to penetrating deep inside the formation. The effect is temporary with the layer being removed after the diversion.

Previous methods of addressing leakoff have included transporting a gel to the target zone by pump with additional acid or brine as a viscous fluid. The formation of a gel begins immediately on the surface in such prior methods. In contrast, the compositions and methods of the present invention isolate the reactants so that reaction is delayed and not initiated until the emulsion is downhole. Due to this delay in initiation of the reaction, the current invention creates gelling in-situ and strong acid and concentrated silicates can be used in the current invention. This allows the temporary damage and diversion of acid treatment during an acidizing treatment or acid fracturing that is generally not possible using concentrated acids and silicates.

While it is recognized that certain acids, such as sulfuric acid, have a delayed reaction time without isolation, the acid emulsion allows the use of a range of acids that are isolated thus allowing for control of the delay until the appropriate target zone is reached. Similarly, pH can be used to control the reaction time. However, the use of the emulsion that breaks at the target zone allows for enhanced precision and control over different methods used alone to time the intended reaction.

In an aspect, the acid emulsion fluids can also include conventional well treating additives, such as breakers, emulsifiers, surfactants, friction reducers, fluid loss additives, and the like. Other suitable additives that can be used in embodiments will be apparent to those of skill in the art.

It has been mentioned that the created silicate gel has the characteristics of being (1) thin and (2) strong. It has been found that an aqueous fluid with a high concentration HCl, such as 20 wt. %, can easily penetrate through this thin and strong layer. Also, an aqueous mixture of 5 wt. % HCl and 20 wt % of a mutual solvent can break this gel. Other conventional techniques of gel removal could be done, as well.

EXAMPLES

Testing Procedure

FIG. 1 shows the instruments used to test leakoff under static conditions. The procedures performed are described in *Reservoir Stimulation*, M. J. Economides and N. K Nolte, (3rd Ed.), John Wiley & Sons Ltd, Chichester, England, (2000), 8-23: 8-24, which cited pages are fully incorporated herein by reference. This procedure is used to test the ability of silicate gel compositions described herein to sustain high differential pressure without leaking through the core. The selected rock samples were Indiana limestone. The core plug is inserted in a core holder inside a cell and sealed from end-sides positioned vertically. The various compositions are then placed above the upper face of the core and pressure was applied by nitrogen above the composition. The pressure was increased gradually until the core starts leaking the composition from the core end. The highest pressure was recorded and reported in Table 1 and Table 2 below.

As demonstrated by the data in Table 1 and Table 2, stable compositions containing two reacting fluids could be formed. If the electrical conductivity is greater than zero, then the emulsion is believed to have an aqueous acid external phase; otherwise, it is believed to have a diesel external phase. Standard additives such as emulsifiers and corrosion inhibitors within their normal concentrations can be incorporated in the compositions. Aqueous compositions containing 5 and 10 wt. % sodium silicates at different volume proportions with hydrochloric acid and diesel can combat leakoff.

TABLE 1

Various emulsified compositions with 0.5 vol. % cationic emulsifier in diesel, 20 wt. % hydrochloric acid (with proper corrosion inhibitors) in water, and 5 wt. % sodium silicate in water.

| Total Volume mL | Diesel Vol. Frac. | Hydrochloric Acid Vol. Frac. | Sodium Silicate Vol. Frac. | Electrical Conductivity Unit | Max ΔP psi |
|---|---|---|---|---|---|
| 300 | 0.3 | 0.63 | 0.07 | 0 | 50 |
| 300 | 0.3 | 0.56 | 0.14 | 0 | 100 |
| 300 | 0.3 | 0.49 | 0.21 | >0 | 200 |
| 300 | 0.3 | 0.42 | 0.28 | >0 | 200 |
| 300 | 0.3 | 0.35 | 0.35 | 0 | 100 |
| 300 | 0.3 | 0.28 | 0.42 | 0 | 200 |
| 300 | 0.3 | 0.21 | 0.49 | 0 | 150 |
| 300 | 0.3 | 0.14 | 0.56 | 0 | 700 |

TABLE 2

Various emulsified compositions with 0.5 vol. % cationic emulsifier in diesel, 20 wt. % hydrochloric acid (with proper corrosion inhibitors) in water, and 10 wt. % sodium silicate in water.

| Total Volume mL | Diesel Vol. Frac. | Hydrochloric Acid Vol. Frac. | Sodium Silicate Vol. Frac. | Electrical Conductivity Unit | Max ΔP psi |
|---|---|---|---|---|---|
| 300 | 0.3 | 0.63 | 0.07 | 0 | 100 |
| 300 | 0.3 | 0.56 | 0.14 | >0 | 250 |
| 300 | 0.3 | 0.49 | 0.21 | >0 | 250 |
| 300 | 0.3 | 0.42 | 0.28 | >0 | 350 |
| 300 | 0.3 | 0.35 | 0.35 | 0 | 700 |
| 300 | 0.3 | 0.28 | 0.42 | >0 | 650 |
| 300 | 0.3 | 0.21 | 0.49 | 0 | 700 |

Delivery Methods:

The acid emulsion compositions can be used in the following applications and methods: (1) The compositions can be used in different well treatments, such as matrix acidizing and acid fracturing; (2) The compositions described herein can be pumped either as bullheading directly from wellhead valve, by coiled tubing (CT) or by drill pipe; (3) The compositions described herein can be pumped as a main treatment fluid or with alternating staged fluid with other acid fluids such as regular acid and/or retarded acid; (4) The compositions described herein can be used with pre and/or post fluids as treatment requires; and (5) The compositions described herein can be used in openhole and/or cased perforated vertical wells, deviated or horizontal water, oil or gas wells. Other suitable applications in which the compositions described herein will be apparent to those of skill in the art and are to be considered within the scope of the present invention.

Those skilled in the art will recognize that changes and modifications may be made to the composition and method within the scope and spirit of the invention as described in the foregoing specification. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments.

What is claimed is:

1. A silicate gel composition comprising sodium silicate and water, wherein the composition is useful for sealing the face of a fracture of a formation that is operable to form a sealing layer upon and adhere to the face on the formation and is operable to maintain a maximum differential pressure value of at least 50 pounds-per-square-inch-differential (psid) across the sealing layer while upon the face of the formation.

2. The silicate gel composition of claim 1 where the silicate gel composition is operable to maintain a maximum differential pressure value in a range of from 50 to 700 psid across the sealing layer.

3. The silicate gel composition of claim 1 where the silicate gel composition is operable to maintain a maximum differential pressure value in a range of from 600 to 700 psid across the sealing layer.

4. The silicate gel composition of claim 1 where the silicate gel composition is operable to deny penetration of a fluid through the sealing layer of silicate gel composition when the fluid has a hydrochloric acid concentration of less than 20 weight percent of the fluid.

5. The silicate gel composition of claim 4 where the silicate gel composition is operable to permit penetration of a fluid through the sealing layer when the fluid has a hydrochloric acid concentration greater than 20 weight percent of the fluid.

6. The silicate gel composition of claim 1 where the silicate gel composition is operable to break upon introduction of a mixture comprising:
  hydrochloric acid;
  a mutual solvent to the silicate gel composition and water; and
  water.

* * * * *